United States Patent [19]

Bruffey et al.

[11] Patent Number: 4,945,475
[45] Date of Patent: Jul. 31, 1990

[54] HIERARCHICAL FILE SYSTEM TO PROVIDE CATALOGING AND RETRIEVAL OF DATA

[75] Inventors: Bill M. Bruffey, Cupertino; Gursharan S. Sidhu, Menlo Park; Patrick W. Dirks, Cupertino; Christopher R. McFall, Palo Alto, all of Calif.

[73] Assignee: Apple Computer, Inc., Cupertino, Calif.

[21] Appl. No.: 442,408

[22] Filed: Nov. 21, 1989

Related U.S. Application Data

[63] Continuation of Ser. No. 924,802, Oct. 30, 1986, abandoned.

[51] Int. Cl.$^5$ .............................................. G06F 15/40
[52] U.S. Cl. .................................. 364/200; 364/283.2; 364/282.1; 364/283.1

[56] References Cited

U.S. PATENT DOCUMENTS

| | | | |
|---|---|---|---|
| 4,468,728 | 8/1984 | Wang | 364/200 |
| 4,606,002 | 8/1986 | Waisman et al. | 364/300 |
| 4,611,272 | 9/1986 | Lomet | 364/300 |
| 4,677,550 | 6/1987 | Ferguson | 364/200 |
| 4,734,856 | 3/1988 | Dowis | 364/300 |
| 4,750,106 | 6/1988 | Aiken, Jr. | 364/200 |
| 4,760,526 | 7/1988 | Takeda et al. | 364/300 |

OTHER PUBLICATIONS

Douglas Comer, "The Ubiquitous B-Tree", Computing Surveys, vol. 11, No. 2, Jun. 1979, pp. 121-136.

Primary Examiner—Gareth D. Shaw
Assistant Examiner—Kevin A. Kriess
Attorney, Agent, or Firm—Blakely, Sokoloff, Taylor & Zafman

[57] ABSTRACT

A hierarchical filing system provides a cataloging of data stored in various locations within a memory device. An upside-down tree type structure provides a downwardly expanding cataloging structure wherein directories provide for further branchings. A branching from a directory is terminated when a file is reached. Each directory is assigned a unique directory identifier value. Then, each file or directory is coupled with the directory identifier value of its parent to provide the interconnection necessary to form the cataloging structure. The complete cataloging structure is organized in the leaf nodes of a B-Tree structure and distributed in an ascending order of the key values to provide a systematic search for a given key. Each file is capable of storing a predetermined number of location description information when data is segmented into non-contiguous segments in memory. A file extents record is used to maintain record of the further segmentation. File location information is kept in the form of file extents descriptors in the leaf nodes of the separate File Extents B-Tree. This extents information is sorted in an ascending order based on a key comprised of a unique file number of a file relative starting block location of the file extent.

6 Claims, 5 Drawing Sheets

FLAT FILING SYSTEM
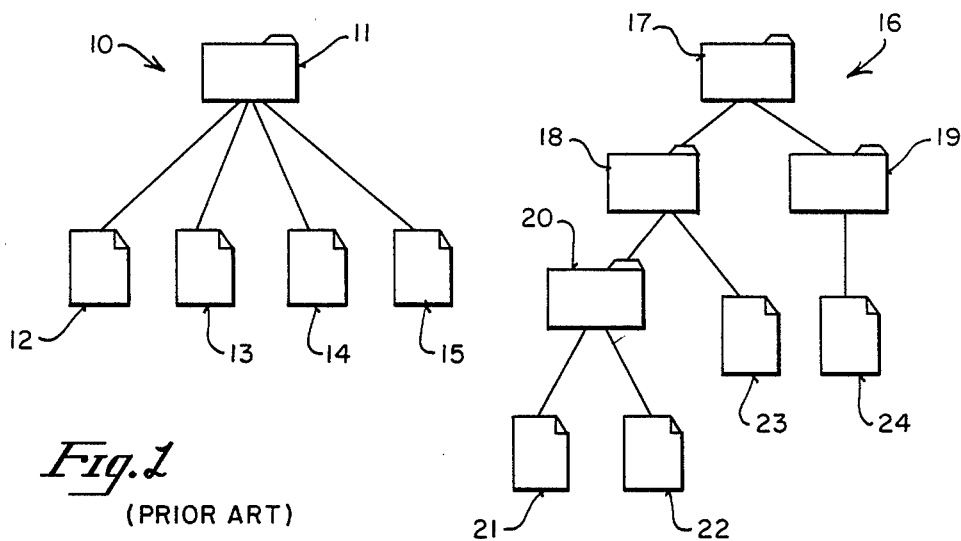
Fig. 1
(PRIOR ART)
HIERARCHICAL FILING SYSTEM
Fig. 2
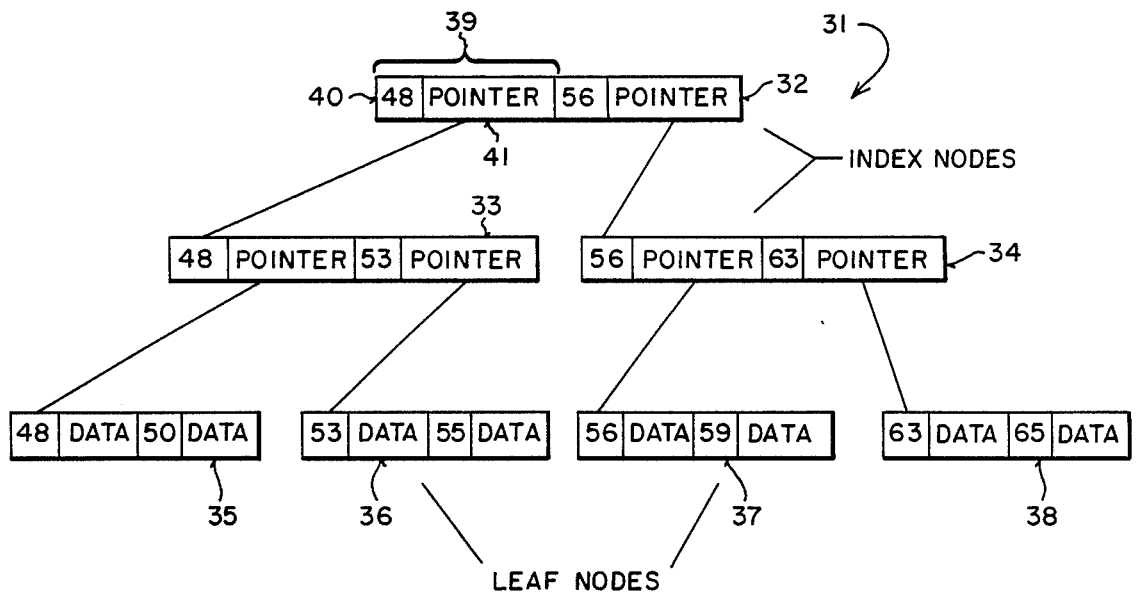
Fig. 3

HIERARCHICAL FILE SYSTEM TO PROVIDE CATALOGING AND RETRIEVAL OF DATA

This is a continuation of application Ser. No. 924,802 filed Oct. 30, 1986 now abandoned.

BACKGROUND OF THE INVENTION

1. Field of the Invention

The present invention relates to the method of storing and retrieving data using a computer, and more specifically to a hierarchical filing system.

2. Prior Art

In a computer system, information is typically stored as signals on various storage mediums, such as magnetic tapes, disks, semiconductor devices, etc. As storage densities increased with advances in storage device technology, it became possible for a device to store much more information than previously.

When information is stored on a device, it is cataloged so that the same information is later retrieved when desired. Normally, a unique code name is attributed to a particular body of data to differentiate it from others. To retrieve a desired body of data, an appropriate code name associated with that data is used, wherein the device searches for that code name and retrieves the desired data when that code name is found.

It is well-known in the prior art that each separate body of data is termed a file and the cataloging of these files on a device is termed filing. Typically, code names associated with particular data contain pointers which point to areas in memory reserved for mass storage. The various code names and their pointers comprise the cataloging system. When high-density storage devices are used, millions of bits of information are capable of being stored on such a device, which permits hundreds, thousands, and even millions of files to be created. To search through these files in a serial fashion to look for a specific file is time-consuming.

It is appreciated that what is needed is a filing system for a high-density storage medium which rapidly searches and retrieves the desired file stored. Further, with the advent of the personal computer (PC) and the small business computer, where physical size is a concern, it is desirable to have a filing system which may be implemented in a lesser line of program, yet be effectual.

SUMMARY

A method for providing a hierarchical filing system is described. The hierarchical filing system provides a catalog of the data stored in various locations within a memory device. Typically, one cataloging structure is used to organize a volume of memory.

The cataloging structure of the hiearchical filing system is provided by an upside-down tree type structure wherein there is a starting directory which operates as a root directory. Other directories and files emanate as off-spring. A plurality of descendant levels branch downward to provide the hierarchical structure of the catalog. The cataloging structure contains the location information of where the actual data is stored.

The file cataloging system is implemented using a B-Tree. The cataloging information is kept in the leaf nodes of the B-Tree. The non-leaf nodes (index nodes) of the B-Tree contain information that allows searching for particular catalog information by using the code name or key of the corresponding file. Key values, which are used to identify and catalog various files in the cataloging system, are also used to organize the catalog in the leaf nodes of the B-Tree. The keys are placed in an ascending order for systematic access. Further, the B-Tree grows by using left rotates and left splits with insertion of catalog information about new files from the right to maintain a balanced tree.

When a file's data is stored, additions, deletions and modifications will typically result in non-contiguous physical storage of the data in the memory device. Each of the contiguous segments of the file is known as a file extent. A record of the physical location of the extents for a particular file is maintained in one or more extents records. The hierarchical filing system uses a file extents list to maintain the extents records of the various files on the memory device.

The present invention maintains the first extents record of a file in the cataloging structure, but any further extents records are maintained in a separate file extents list. This file extents list is also implemented in a second B-Tree structure.

BRIEF DESCRIPTION OF THE DRAWINGS

FIG. 1 is a representation of a prior art flat filing system.

FIG. 2 is a representation of a hierarchical filing system of the present invention.

FIG. 3 is a representation of a B-Tree structure of the present invention.

DETAILED DESCRIPTION OF THE PREFERRED EMBODIMENTS

Figure 4:
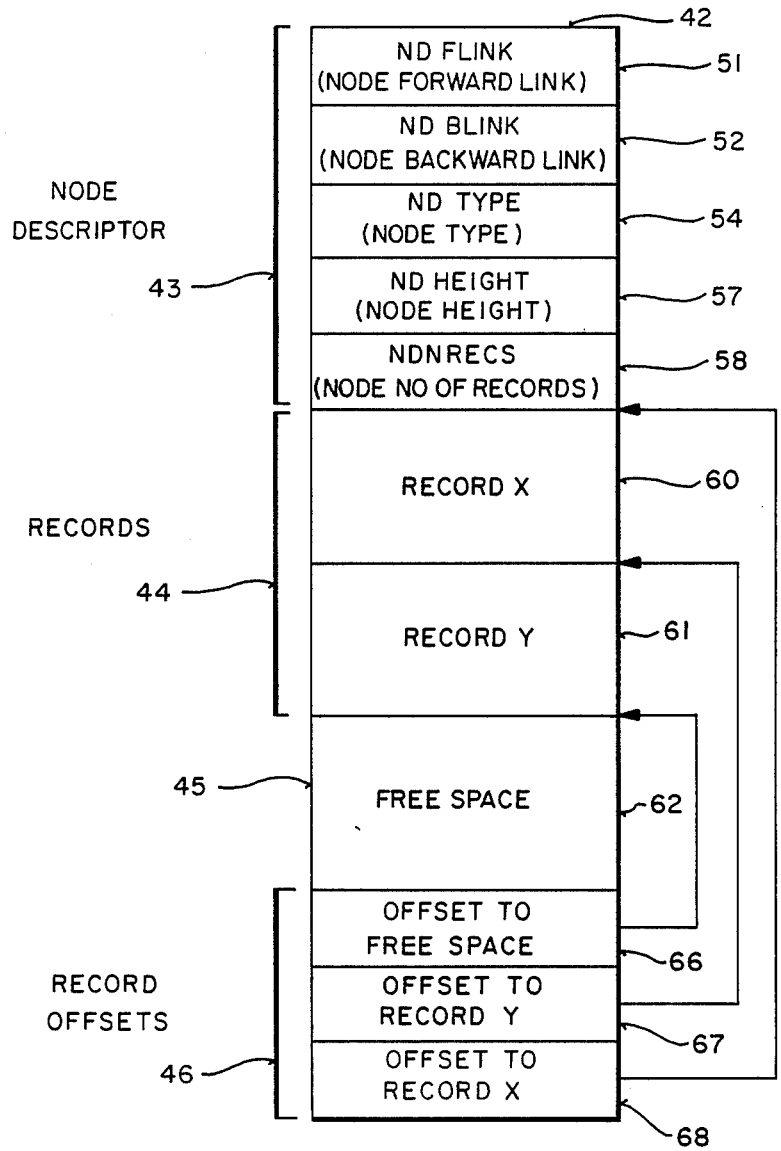
FIG. 4 is a representation of contents of a node for the B-Tree structure of FIG. 3.

The present invention describes a method of storing and retrieving information using a hierarchical filing system. In the following description, numerous specific details are set forth in order to provide a thorough understanding of the present invention. It will be obvious, however, to one skilled in the art that the present invention may be practiced without these specific details. In other instances, well-known methods have not been described in detail in order not to unnecessarily obscure the present invention.

Referring to FIG. 1, a prior art flat filing system 10 is shown having a directory 11 and files 12–15. For ease of understanding, a directory is shown pictorially as a folder and a file is shown as a sheet of paper with a folded corner. The pictorial representation applies well to an analogy of placing papers into folders (files into directories). In the prior art system 10, there is present a single directory 11, which contains locator information for files 12–15. Each of the files 12–15 contain data which would be associated with a specific body of stored information. In this particular example of a prior art system 10, to access file 15, a serial search is made through directory 11, until the file address of file 15 is located, such sequential search resulting in considerable lapse of time when substantial numbers of files exist in the directory 11. Although in this hypothetical example, directory 11 maintains pointer addresses to four files 12-15, directory 11 will continue to store addresses of subsequent files in a sequential fashion.

FIG. 2 illustrates the architecture of the Hierarchical Filing System (HFS) of the present invention. This particular HFS 16 includes a root directory 17 and files 21-24. The HFS 16 also includes directories 18-20. Each directory is capable of containing files, as well as other directories such as directory 18 containing directory 20. Each directory is a branching node, allowing for none or a plurality of sub-branching nodes. Each directory contains information which permits the branching to occur. The actual data is stored in the files 21-24. Because each file is a termination node, it does not need to maintain further branching information. Instead, each file stores the actual data. Therefore, the directories 17-20 maintain branching information, while files 21-24 contain the stored data.

HFS 16 accesses files 21-24 in a hierarchical fashion so that serial search for the files is not necessary. Assume in the example of FIG. 2 that access to data stored in file 23 is desired. A search of directory 17 reveals that two possible paths exist in seeking the address of file 23. One path from directory 17 leads to directory 18 and the other path leads to directory 19. The desirable path is to directory 18, at which point there are again two paths. The desirable path from directory 18 leads directly to file 23. Although this example is simplistic because of the miniscule number of files shown, one can appreciate the file search time saved when a substantially large number of files are present.

Further, as an example, if file 22 had been chosen, the path from directory 18 would have led to directory 20, at which point two paths exist from directory 20. The desirable path to file 22 from directory 20 then would have been chosen. HFS 16, although shown in a particular form in FIG. 2, may have any number of levels (branchings) down from the root directory 17 as well as any number of branches from a particular directory. However, it is to be noted that all data is stored in the represented files 21-24 which are all located at the termination nodes of HFS 16.

In actuality, the cataloging architecture of the preferred embodiment contains cataloging locator description information in the HFS 16 structure. The catalog entries for files 21-24 contain pointers which provide locator descriptions to locate places in storage area where actual stored data is kept.

B-TREE

The HFS of the present invention is implemented using two B-Tree structures in the preferred embodiment, the Catalog B-Tree and the File Extents B-Tree. A B-Tree structure is well-known in the prior art and is described in *The Art of Computer Programming* Volume 3 (Sorting and Searching); by Donald E. Knuth; at Section 6.4; titled "Multiway Trees"; pp 471–479 (1973). The nodes of a B-Tree contain records, wherein each record is comprised of certain information, either pointers or data, and a key associated with that record.

Referring to FIG. 3, a hypothetical B-Tree is illustrated. A basic feature of the B-Tree 31 is that data is stored only in leaf nodes 35-38. The internal nodes 32-34, also known as index nodes, contain pointers to other nodes such that these index nodes 32-34 provide an index for accessing the data records stored in the leaf nodes 35-38. Each record 39 includes a key 40 and an information segment 41. Within each node, the records are maintained so that their keys are in ascending order. The example B-Tree 31 of FIG. 3 contains hypothetical keys which have been inserted to show the structure of the tree, and the relationship between index nodes 32-34 and leaf nodes 35-38. Leaf node 35 contains key values 48 and 50. The first key of a node is also represented as a key in its ascending node. Therefore key 48, which is the first key of leaf node 35, is also represented as a key within index node 33. Key 53, which is the first key of leaf node 36, is represented as the second key of index node 33. Also, because key 48 is the first key within index node 33, it is again represented as a key within index node 32. This pattern is repeated for each leaf node 35-38 and each ascending index node 32-34 for a B-Tree structure. Although FIG. 3 shows only three levels and two keys per node, any number of keys per node, as well as any number of levels, may be chosen for a particular B-Tree structure. B-Tree 3 of FIG. 3 as drawn is a hypothetical example for illustration purpose only.

When a data record is needed, the key of the desired record is provided. The search begins at the root node, which is also an index node. A search is performed within the node until the record with the highest key that is not higher than the search key is reached. Assume in the hypothetical example of FIG. 3, that data with key 59 is to be selected. The search commences at the root node 32, wherein key 56 is selected because the value 56 is the highest key that is not greater than the search key itself. The pointer of key 56 selects index node 34, wherein the search continues within index node 34. Again, key 56 is chosen because it is the highest key that is not greater than the search key itself (the next key 63 is greater than the search key). The pointer of key 56 in index node 34 selects leaf node 37. Within leaf node 37, another search is made to identify search key 59. When search key 59 is found, its associated information (data) is used.

A particular pointer in an index record leads to another node one level down in the B-Tree 31. For example, node 32 to node 34. The process continues until a leaf node is reached whereupon its records are examined until the desired key is found. If the desired key is not present, then the search stops when a key larger than the search key is reached or when all the records in the leaf node have been examined. The key values may be numeric, alphabetical or alphanumeric.

Referring to FIG. 4, it shows the structure of any of the nodes of a B-Tree of the present invention. Each node 42 includes a node descriptor segment 43, records segment 44, record offset segment 46, and can have a free space segment 45. Each node 42 begins with a node descriptor segment 43. NDNRECS 58 contains the number of records currently in the node. NDTYPE 54 indicates the type of node, either leaf or index node. NDHEIGHT 57 indicates the height of the node in the tree, wherein leaf nodes are chosen as level 1, and the index nodes just above them are at level 2, etc. NDBLINK 52 and NDFLINK 51 are used with B-Tree nodes as a way of quickly moving through the records of the various nodes at a given level. For each node, NDBLINK 52 contains a pointer to the previous node, and NDFLINK 51 contains a pointer to the subsequent node at the same level. In FIG. 3, NDBLINK for node 36 would point to node 35 and NDFLINK for node 36 would point to node 37. Therefore, NDBLINK 52 and NDFLINK 51 are means of locating adjacent nodes without first reversing back up the B-Tree.

The records segment 44 contains the B-Tree's records, each with its key and pointer or data information. In this particular example, there are two records 60 and 61. The records in a node can be of variable length. For this reason, offsets to the beginning of each record are needed. The records segment begins immediately following the node descriptor segment 43. The records are followed by a free space segment 45, which is basically the unused space of the node. Therefore, free space segment may not exist in some instances. The record offset segment 46 at the end of the node contains the offset information for records 60 and 61. Offset 68 contains offset information for record 60 and offset 67 contains offset information for record 61. Offset 66 contains the offset necessary to determine free space 62. Thus the record segment 44 builds downward into the free space segment 45, while the record offset segment 46 builds upward into the free space segment 45 from the opposite end.

If node 42 is an index node, then each record 60 and 61 is comprised of a key and pointer information. Further, NDFLINK 51 and NDBLINK 52 would contain adjacent index node linking pointers. If node 42 is a leaf node, then each record 60 and 61 is comprised of a key and data information. NDFLINK 51 and NDBLINK 52 would also contain leaf node linking pointers. It is also appreciated that although a particular format is illustrated for node 42, the format may be modified readily to include other types of information. Also, in the preferred embodiment data information in the leaf nodes of the HFS catalog B-Tree is used to address locations in memory where the actual data is stored.

Figure 5:
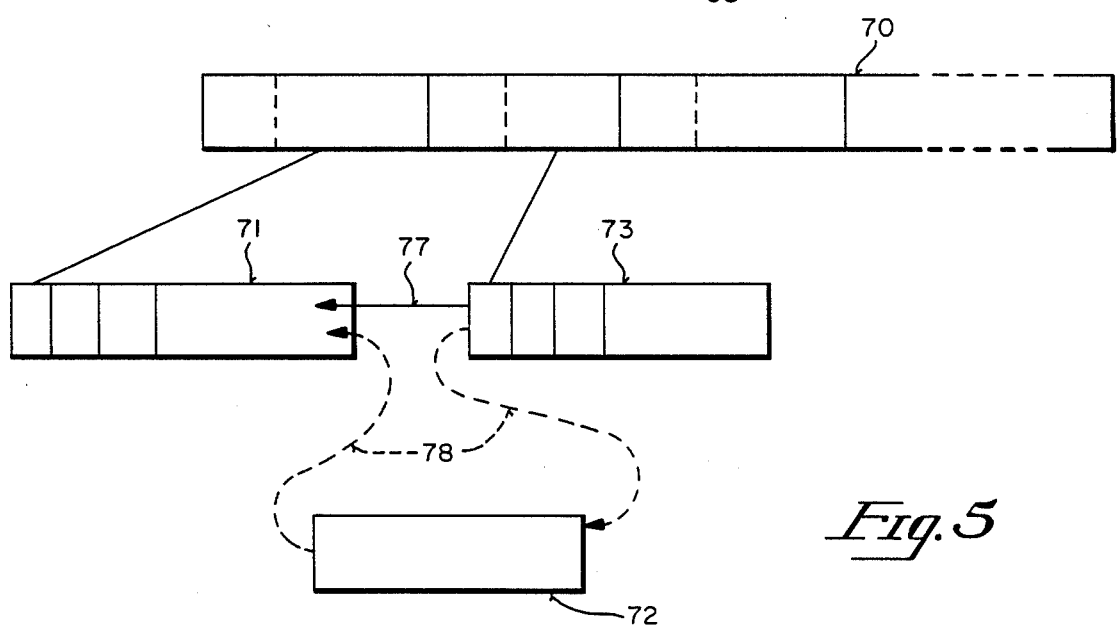
FIG. 5 is a representation of a left-split and a left-rotate operation of a B-Tree structure of the preferred embodiment.

Referring to FIG. 5, a specialized B-Tree expansion architecture as implemented in the preferred embodiment is shown. A node 70, which is equivalent to node 42 of FIG. 4, is shown having pointers to two lower-level nodes 71 and 73, which may be index or leaf nodes. Although only two nodes 71 and 73 are shown at the lower level, any number of nodes may reside at this lower level. Also in this particular hypothetical example, nodes 71 and 73 are only partially filled.

For a B-tree to maintain its balance, records must be kept uniformly spaced within the hierarchical structure. An unbalanced tree will result when records are not maintained uniformly in each node or nodes are heavily stacked toward one branch of the B-Tree. The preferred embodiment uses a technique of left rotate and left splits to provide movement of records from one node to another to maintain a balanced Tree. When records are to be transferred to another node, the left rotate operation is used. In this instance, records in node 73 are left rotated to its left adjacent node 71, as shown by arrow 77.

If another node is needed, such as when records in node 73 must be rotated and node 71 cannot accommodate records from node 73, a left split operation is used to insert node 72 to the left of node 73, between nodes 71 and 73. In this instance, node 72 is inserted to link node 71 and node 73, as shown by arrows 78. When node 72 is inserted, appropriate pointer links will be established with its index node 70 as well as adjacent link pointers for nodes 71 and 73. Continually moving data leftward and inserting new data at the right extremities helps keep the B-tree balanced. Because the HFS of the present invention is structured to have the ascending nodes organized in a rightward direction, the balancing is maintained even though the rotates and splits are made toward the left direction. It is appreciated that right splits and rotate operations, or balanced insertions using both right and left operations can be used as well. Although the preferred embodiment uses and attempts to maintain a balanced B-Tree for search efficiency, most any B-Tree structure can be used, including unbalanced B-Tree.

CATALOG TREE

Figure 6:
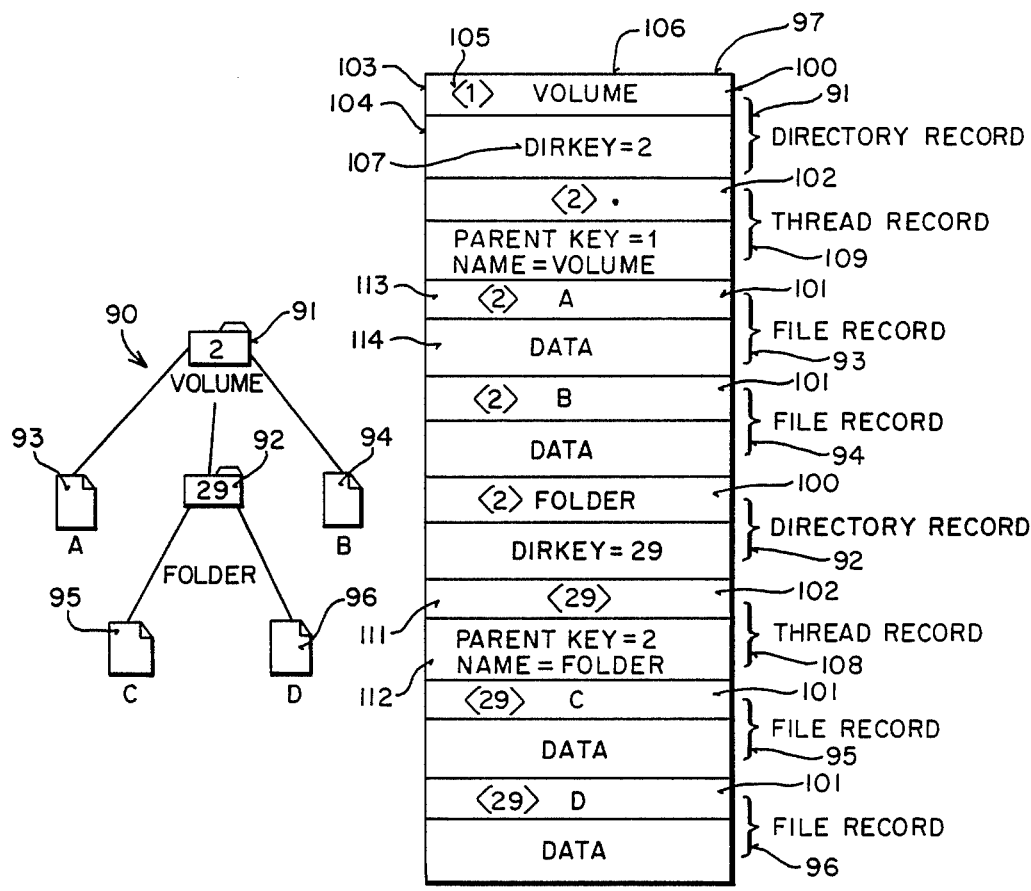
FIG. 6 is a representation of a cataloging structure of the preferred embodiment and an organization of the cataloging structure in various nodes of a B-Tree.

Referring to FIG. 6, a hypothetical catalog 90 is used to illustrate the implementation of cataloging of the preferred embodiment. The structure 90 has a root directory 91 named "Volume". Each directory of the preferred embodiment is assigned a unique numerical identifier known as the directory identifier (DirID). The root directory of catalog 90 has DirID value of 2. Root directory 91 has three branches comprised of directory 92 and files 93 and 94. Directory 92 has a name of "Folder" and a DirID value of 29. In turn, directory 92 has two branches comprised of files 95 and 96. Files 93-96 are named "A", "B", "C" and "D", respectively in this example. The architecture of the directories and files follows the HFS structure as previously explained in FIG. 2. The complete cataloging structure 90 is stored as data records in various leaf nodes of the B-Tree of FIGS. 3 and 4 known as the catalog B-Tree. It is appreciated that the cataloging structure 90, although a tree, is in itself not a B-Tree. The form of structure 90 is actually stored in the various leaf nodes of a B-Tree. It is to be appreciated that the cataloging structure 90 not be confused with the previous description of the B-Tree. Catalog 90 and the B-Tree structure are two separate and distinct structures. The hierarchical structure of the catalog 90 is implemented as a B-Tree structure and stored as data records in leaf nodes of a B-Tree similar to that of FIGS. 3 and 4.

The hierarchical catalog structure 90 is stored in a storage device as shown by a memory map 97 of FIG. 6. Cataloging map 97 is comprised of three possible types of records: directory records 100, file records 101, and thread records 102. Each record 100-102 is comprised of a key 103 and information segment 104, as earlier described in the description of a leaf node of a B-Tree. The key 103 of each record is comprised of a value 105 and a name 106. The key 103 of a directory record, such as that of 91 and 92, is comprised of its directory name 106 and its parent directory's DirID value 105. A information segment 104 of each directory record, such as that of directories 91 and 92 is comprised of the directory's DirID value 107. For directory 92, the directory's DirID has been given the value of 29, and has a name of "Folder". The parent DirID of record 92 has been given the value 2 because directory 92 is an offspring of directory 91 in the structure 90. Directory record 91 has a directory DirID value of 2, with a corresponding name of "Volume". Because directory 91 is a root directory, the parent DirID value has been given the value of 1, wherein the value 1 refers to the foundation of the filing system itself.

A file record, such as file records 93-96, is also comprised of a key 113 and an information segment 114, wherein key 113 is also comprised of a parent DirID value and a name. However, in the information segment 114, the descriptive location information for the actual stored file data is maintained as well as a unique file number. The information segments 114 of file records 93-96 contain the descriptive location of the actual stored data information.

File record 94, having a file name of B, and file record 93, having a file name A, both have a parent DirID value of 2. The parent DirID value of 2 signifies that files A and B are direct offsprings of directory "Volume" having a DirID value of 2. File 95, having a name C, and file 96, having a name D, have parent DirID values of 29, which reflect the origination of files C and D as offsprings of directory 29 labeled "Folder", having a DirID value of 29. Therefore, by looking at any file or a directory record's key 103, the stored information provides the identification of the name of that particular record as well as the DirID value of the parent node.

To provide the interconnection of the different branches, a thread record 102 is provided for each directory. The key of a thread record contains a DirID value and a null-name, which is equivalent to having no name at all. In the example of FIG. 6, thread record 108 provides the connection between the directory "Folder" and files C and D. In the key 111 of thread record 108, only the directory DirID value of "Folder" is given. In the information segment 112 of thread record 108, the DirID of "Folder"'s parent and the directory's name "Folder" are given. Therefore, when file C, having a parent DirID 29 attempts to link to its immediate parent directory 92, which has a DirID of 29, the thread record 108 provides the name (Folder) of the parent directory 92, as well as the parent DirID value of directory 92, which is equal to 2.

Equivalently thread record 109 provides the name (Volume) of directory 91 as well as its parent directory DirID value for the three offsprings 92-94 of directory 91. By having directory records 91-92, file records 93-96, along with thread records 108-109 for each directory, the cataloging structure 90 is interconnected into a HFS, wherein the descriptive location information for the actual stored data is stored in file records 91-92 as shown in the structure 97 of FIG. 6.

By implementing the cataloging structure 90 using a B-Tree structure, the hierarchical configuration of structure 90 is easily stored in the leaf nodes of a B-Tree of the earlier description. For example, when file C is to be accessed by a computer, the system will implement a B-Tree search. Referring to the catalog example 90 of FIG. 6, when file with name C is to be found, the search path must be specified for this search. This can be given in terms of a sequence of the names of all directories on the path from the root to the said file, thus "Volume", followed by "Folder", and finally "C". The search begins by finding the directory record in the Catalog B-Tree that corresponds to "Volume". Its name is "Volume" and since it is the root, its parent DirID value is 1. The catalog B-Tree is searched for a directory record with key <1> Volume; thus, directory record 91 is found. Its information segment then provides the DirID value 2 of this directory. Now a search is made through the B-Tree for the record with key <2> Folder which leads to the directory record 92, whose information segment provides this directory's DirID value of 29. Thus now a search of the B-Tree is made to find the data record with key <29>C. This immediately leads the search to the file record 95, whose information segment contains the information about the physical location of the data contained in the desired file.

It will be appreciated that the specification of the file of the above example could start with the DirID value of any directory on the path from the root to the desired file, and would then consist of this DirID value and the sequence of names of the directories on the balance of the path from that directory to the desired file. The search mechanism followed is an obvious variant of the one indicated above.

Although cataloging structure 90 is a simplified structure and FIG. 6 only shows the presence of a single structure having a single root directory 91, a cataloging structure may be enlarged manyfold. The preferred embodiment uses one HFS cataloging structure per memory device, such as a disk. However, such a disk can be partitioned and an HFS catalog assigned to each such partition.

The catalog records of structure 97 of FIG. 6 are stored as the data records in the leaf nodes 42 of FIG. 4 of a catalog B-Tree. These records are inserted and maintained in the catalog B-Tree in ascending alphanumeric order. Thus, if the leaf nodes of the B-Tree are traversed from left to right, the data records will be encountered in the order shown in structure 97 of FIG. 6. This order maintains the records in ascending order first by the DirID value part of the key. Then, among records with the same DirID value in their keys, the order is alphabetical on the name part of the key.

It is also appreciated that other pertinent information may be stored in the various records besides what has been disclosed in FIG. 6. For example, directory and file records of the present invention maintain flags, date and time of creation of the directory or the file, as well as the date and time of last modification. Also, file records include such items as flags for locking the file, values to set logical and physical end of files, and size of the file.

FILE EXTENTS TREE

As already noted, the catalog B-Tree's file record of a particular file contains information about the locations in the memory device where the file's data is stored. The memory device is considered to be a sequentially numbered collection of blocks. A series of contiguous memory blocks is called an extent. Ideally, a file would be stored in a single extent having a contiguous memory allocation space. However, due to the size of certain files, as well as subsequent additions, deletions and modifications to existing files, files are usually stored in more than one allocated area of the memory. Except in the case of preallocated or small files, the contents of a particular file are usually stored in more than one extent, separated into non-contiguous sections on a volume. Each file extent can be identified by an extent descriptor. Thus, the complete location information of a particular file is a sequential extents list consisting of the extent descriptors of the various extents containing the file's data.

The file extents list of the present invention is organized also as a B-Tree, known as the File Extents B-Tree, and records the volume location and size of the various extents that comprise the files. Although most any memory allocation system can employ the file extents record of the present invention, a specific memory allocation system is described to illustrate the file extents record of the preferred embodiment.

Figure 7:
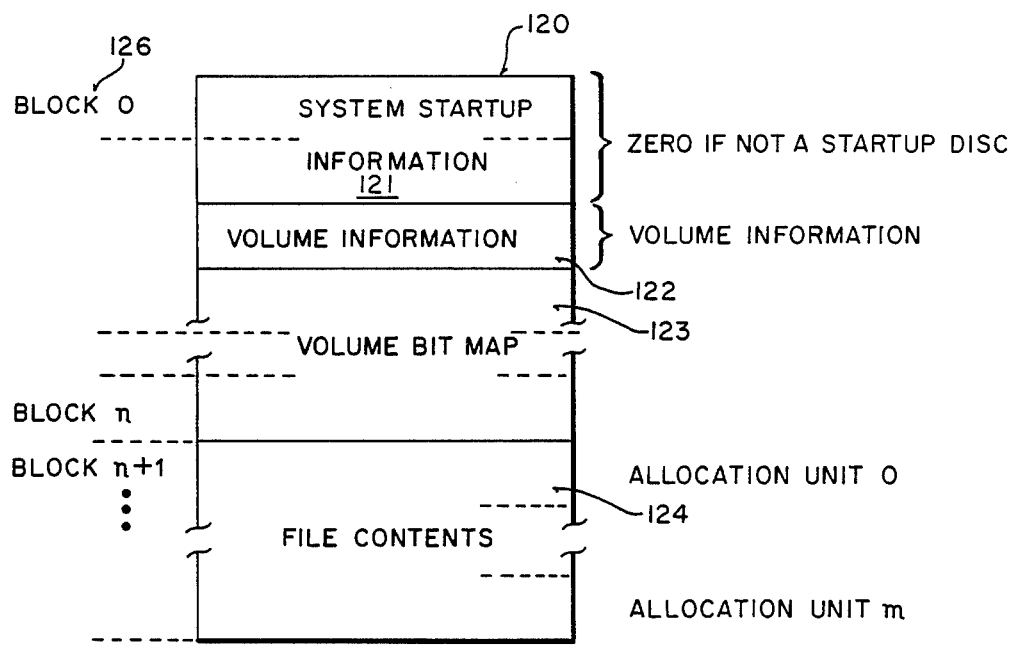
FIG. 7 is a representation of a volume allocation mapping in a filing system of the preferred embodiment.

Referring to FIG. 7, a memory volume 120 which is a portion of a memory device, such as a hard disk, is shown. Volume 120 is segmented into a number of logical blocks 126. Typically, each logical block 126 is comprised of a predetermined fixed number of bytes, such as 512 bytes for the preferred embodiment. A fixed number of logical blocks starting at block 0 and ending at block n is reserved for volume information. The balance of the memory device starting at block n+1 is available for data storage and this storage area is separated into allocation units, wherein each allocation unit is comprised of one or more contiguous logical blocks.

Volume 120 includes four areas 121–124. System start-up area 121 contains certain configurable system parameters which are well-known in operating a disk or other memory devices. Volume information area 122 contains information regarding the housekeeping parameters of the volume, such as number and size of each allocation unit. Volume bit map 123 maintains record of each allocation unit on the volume 120 and uses a bit map to designate use or non-use of each allocation unit.

Commencing at block n+1, a file content area 124 extends to the end of the Volume 120. File content area 124 is separated into a number of allocation units, wherein each allocation unit is comprised of a fixed number of logical blocks. While the bit map 123 maintains volume space management, it does not provide file mapping. The file mapping function is provided by the file extents lists.

Figure 8:
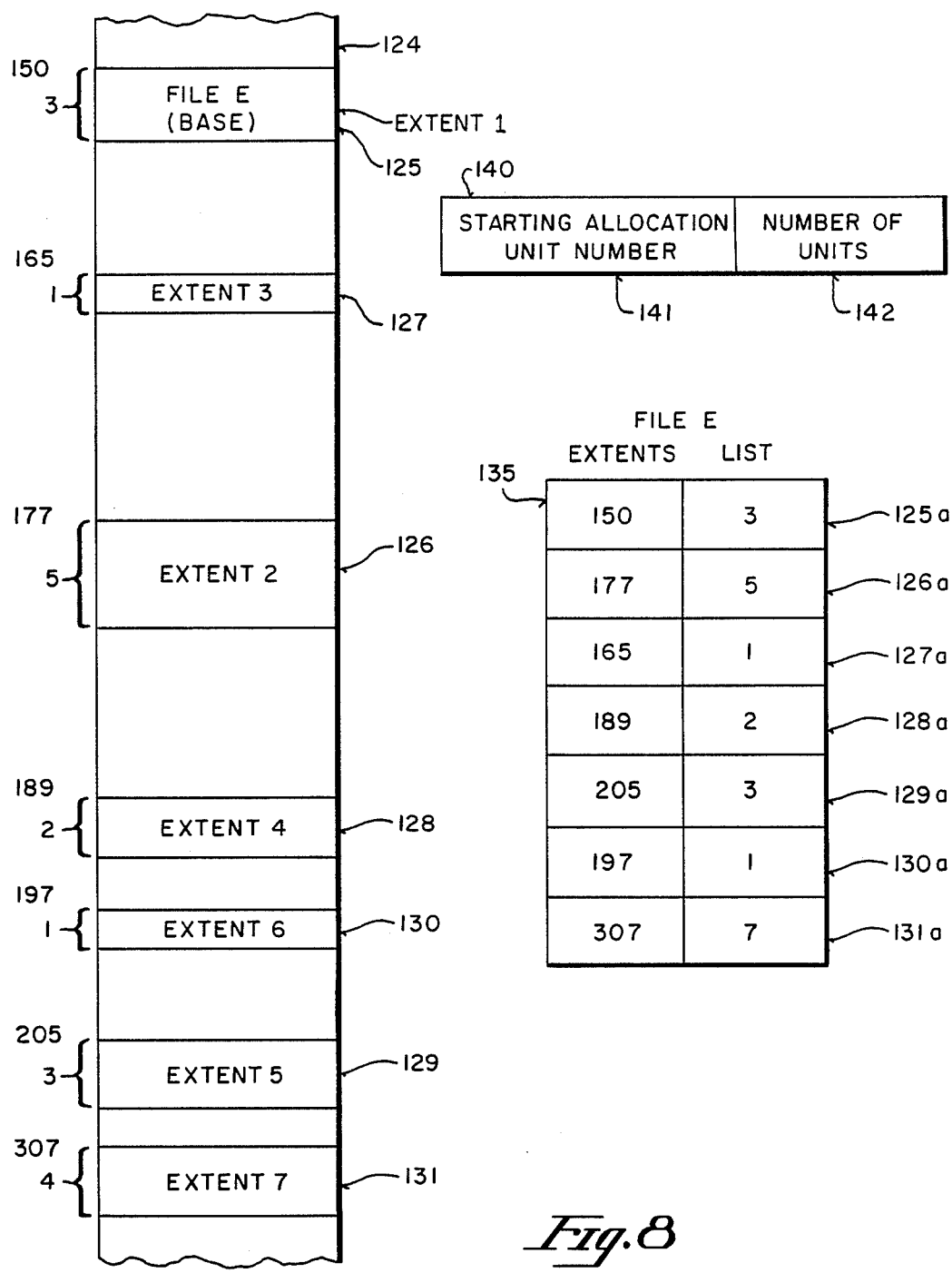
FIG. 8 is a representation of a file extents list of the preferred embodiment and showing various file extents in memory.

Referring also to FIG. 8, a portion of file contents area 124 is shown containing information attributed to a file labeled file E. In this hypothetical example the entire contents of file E are separated into seven extents 125–131. The first portion of the file is stored in base extent 125, the subsequent portions of the file are distributed accordingly in extents 2–7 which are labelled 126–131. File E has seven extents 125–131 which are not physically contiguous. To maintain file extents information an extent descriptor 140 is used for the base extent 125 and each of the subsequent extents 126–131 of file E.

Extent descriptor 140 is comprised of a starting allocation unit number 141 and number of allocation units 142. File E extents list 135, which is comprised of seven extent descriptors 125a–131a, provides information as to the address and length of each extent 125–131 of file E. For example, the fourth extent 128, which has a starting allocation address of 189 and is only two allocation blocks long, has a value of 189 in field 141 and a value of 2 in field 142 of descriptor 128a.

Extents descriptors of all files in a volume are maintained in the present invention in the data records contained in the leaf nodes of B-Tree such as of FIGS. 3–5. This tree is known as the File Extents B-Tree and is a separate B-Tree from the earlier described catalog B-Tree. Each data record of this extents B-Tree consists of a key and an information segment as before in the discussion of FIGS. 3–5. The information segment of a File Extents B-Tree data record is comprised of a sequence of extents descriptors of a particular file. The maximum number of extents descriptors in such a record can vary from implementation to implementation, but in the preferred embodiment is set to three. The key of the File Extents B-Tree record consists of two fields: the file number of the particular file and the file relative posistion of the starting block of the first extent descriptor in that record. These extents records are kept in the leaf nodes of the Extents B-Tree sorted in ascending order first on the file number field and then on the file relative position of the starting block. This allows efficient search through the B-Tree for the location information of data at a particular file relative position.

Figure 9:
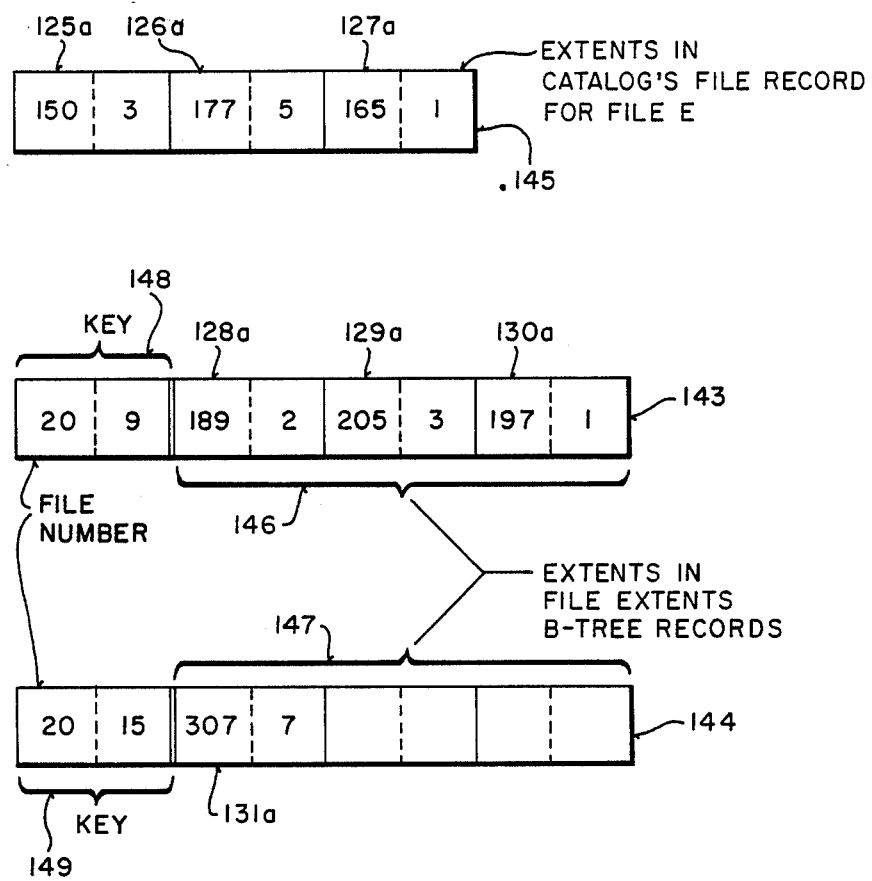
FIG. 9 is a representation showing the file extents organization in the Catalog and Extents B-Trees of the preferred embodiment.

In actuality, the preferred embodiment stores three extents descriptors, base plus two subsequent extents descriptors, the information data segment 114 of the file's catalog B-Tree record such as 94 of FIG. 6. Therefore, in the example of FIG. 8, extent descriptors 125a, 126a and 127a are kept in the information segment of the cataloging structure and extents 128a–131a are kept in the File Extents B-Tree as shown in FIG. 9. Permitting limited extent information to be kept in the data segments of a cataloging structure permits faster access to data. Only when a file contains four extents or more, will it need to consult the File Extents B-Tree. It should be appreciated that the number of extents which are kept in the file's Catalog B-Tree record without using a File Extents B-Tree is arbitrary and can be changed without departing from the spirit and scope of the invention.

Also referring to FIG. 9, it shows a catalog file record 145 and File Extents B-Tree records 143 and 144. As explained in the structure of B-Trees of the present invention, each record 143 and 144 is comprised of a key 148 and 149 and extents list 146 and 147, respectively. To locate a certain portion of the data of a particular file, first the Catalog B-Tree is searched for the corresponding file record. From this file record's information segment, the file number is extracted. Also, the first three extent descriptors in the information segment of the catalog B-Tree file record are examined. If the required file data is contained within the corresponding extents, then the location information is now readily available. If however, the desired file data is located in extents beyond the three in the catalog's file record, then a search is made of the File Extents B-Tree using as a search key the file number and the computed file relative block position of the desired data. This search will lead to the file extent's B-Tree record containing the desired location information.

The example using file E is comprised of 22 blocks and having an arbitrary file number equal to 20. The extent descriptors contained in the catalog file record 145 for file E provide the location information for the first 3 extents which in turn comprises the first 9 blocks (3+5+1) of the file. The location information for the remaining 13 blocks (2+3+1+7) of the file is contained in two data records 143 and 144 within the File Extents B-Tree. Assume that the desired data is at file relative block position 13 within file E. The extent descriptors contained in the file's catalog record are examined first. Since relative block 13 is greater than the number of blocks located by the extent descriptors in the file's catalog record, the File Extent B-Tree is searched. The key used for the B-Tree search for relative block position 13 is <20,13>.

Since the key value of "13" is greater than the value "9" of key 148 for the first Files Extents B-Tree record 143 for file E and is less than the value "15" of key 149 for the second record 144, the search results with a "not found" result but positions to the second B-Tree record 144. By retrieving the previous record 143 of key 148, the extent descriptor for relative block 13 is obtained. The value of "9" for key 148 is derived because extents list 146 starts at the tenth relative block (allocation unit number 9). The value of "15" for key 149 is derived because extents list 147 starts at the sixteenth relative block (allocation unit number 15).

IMPLEMENTATION

The HFS of the present invention is implemented in a computer which is coupled to a memory device, such as a disk, having an ability of storing millions of bits of information, although any storage medium can use the HFS. Typically, the HFS of the present invention provides the cataloging of various groupings of data, such as files, which are stored on the disk.

The preferred embodiment implements data storage by the use of a cataloging structure previously described to catalog data stored on a large capacity memory device. It also maintains a file extents record of up to three extents per file in the catalog. Subsequent extent information is stored in a separate file extents record. Both the catalog record and the extents record are maintained using two B-Trees of the earlier described B-Tree structure.

The HFS as described in the preferred embodiment is controlled by a combination of hardware and software in a computer system. The HFS controlling routines are stored in a separate storage device than the device used for storing the actual data. The preferred embodiment stores the routines in a read only memory (ROM), although most any storage medium may be used.

Thus, a hierarchical filing system for use with a large capacity memory device in described.

We claim:

1. In a computer, a hierarchial filing system to provide cataloging and retrieval of data stored on a storage device, said hierarchial filing system comprising:

a memory for storing a program for said cataloging and retrieval;

a processor coupled to said memory and said storage device for processing an organizing means to catalog and retrieve said data; said processor comprising;

said program for organizing said data on said storage device into a hypothetical catalog which has a root directory, a plurality of branching directories arranged at various subsequent levels from said root directory, wherein some of said branching directories branch from other of said branch directories; said branching directories being interconnected such that for each of said branching directories there is only a singular path from itself to said root directory; and wherein some of said branching directories have at least one file, each file corresponding to a representation of a predetermined portion of said stored data;

an assigning means for assigning a unique identification value to said root directory and each of said branching directories, and assigning an identification name to each of said files, root directory and branching directories, wherein each of said branching directories and files are each provided with a key comprised of its identification name and its next higher level directory identification value;

a list forming means for forming a linear list of files and directory entries such that said file and directory entries are ordered by said keys, such that said root directory being the highest level and files being the lowest level; and said interconnection of each of said singular path is provided by each file and branching directory identification name being associated with directory identification value of its next higher level;

a structure forming means for forming a B-Tree indexing structure having a beginning node, a plurality of indexing nodes and a plurality of terminating nodes, and wherein said linear list is stored in said terminating nodes of said B-Tree indexing structure.

2. The hierarchial filing system defined in claim 1, wherein said memory for storing said program is a read only memory.

3. In a computer system where data is to be catalogued when stored into a memory device, a method performed by the computer system for providing a hierarchial filing system to catalogue said data into a volume of said memory device for subsequent retrieval, comprising the steps of:

creating a root directory, a plurality of subdirectories and a plurality of files;

organizing said root directory, subdirectories and files into a hypothetical catalog wherein said root directory is at a topmost level and said subdirectories are arranged at various subsequent levels from said root directory, some of said subdirectories branch from other of said subdirectories, but said subdirectories being interconnected such that for each of said subdirectories there is only a singular path from itself to said root directory, and wherein each of said files being interconnected to branch from a certain one of said subdirectories only, such that for each file there is only a singular path from itself to said root directory;

assigning a unique numerical directory identification value to said root directory and to each of said subdirectories in said volume;

assigning an identification name to said root directory and to each of said subdirectories and files, such that no two subdirectories branching from a root directory has a same name, no two subdirectories branching from another subdirectory has a same name, and no two files branching from one of said directories has a same name;

wherein each of said subdirectories and files are each provided with a key comprised of its identification name and its next higher level directory identification value;

forming a linear list of files and subdirectory entries such that said file and subdirectory entries are ordered by said keys, such that said root directory being the highest level and files being the lowest level; and said interconnection of each of said singular path is provided by each file and subdirectory identification name being associated with directory identification value of its next higher level;

forming a B-Tree indexing structure having a beginning node, a plurality of indexing nodes, and a plurality of terminal nodes;

storing said linear list in said terminal nodes of said B-Tree structure in alphanumerical order according to said numerical directory value;

assigning said identification name of a given file to a respective portion of said data;

storing said data;

placing memory location information in said files, wherein for each given file its memory location information locates its respective portion of said data stored in said memory device.

4. The method as described in claim 3 wherein said step of forming said B-Tree indexing structure further comprises the step of forming a B-Tree structure wherein said beginning node comprises a root node of said B-Tree, said indexing nodes comprise branch nodes of said Be-Tree, and said terminal nodes comprise leave nodes of said B-Tree.

5. The method as described in claim 4 wherein said step of placing location information in said files comprises the step of providing a plurality of extent pointers, each extent pointer pointing to a location of a portion of said data stored in said memory device corresponding to said given file such that non-contiguous data segments are made to correspond to each said file.

6. The method as described in claim 5 further comprising the step of forming a second B-Tree structure to store a linear list of additional extent pointers for those files which have more extent pointers than that which can be stored in each file, said linear list of additional extent pointers being stored in terminal nodes of said second B-Tree structure by having each additional extent pointer stored in one of said terminal nodes.

* * * * *